(12) United States Patent  
Shirakawa et al.

(10) Patent No.: US 6,695,490 B2  
(45) Date of Patent: Feb. 24, 2004

(54) OPTICAL RING NETWORK, OPTICAL CONNECTOR, AND HYBRID CONNECTOR

(75) Inventors: Tsuguhito Shirakawa, Shizuoka (JP); Nobuyuki Akeda, Shizuoka (JP); Toshiharu Takahashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 218 days.

(21) Appl. No.: 09/891,180

(22) Filed: Jun. 26, 2001

(65) Prior Publication Data

US 2001/0043775 A1 Nov. 22, 2001

Related U.S. Application Data

(63) Continuation-in-part of application No. 09/557,084, filed on Apr. 21, 2000, now Pat. No. 6,390,687.

(30) Foreign Application Priority Data

Jul. 3, 2000 (JP) ........................................ 2000-200751

(51) Int. Cl.⁷ ................................................. G02B 6/36
(52) U.S. Cl. ............................ 385/86; 385/72; 385/88; 385/75; 439/577
(58) Field of Search ........................... 385/86, 75, 72, 385/88, 82, 24; 359/119; 439/577

(56) References Cited

U.S. PATENT DOCUMENTS

| 4,303,300 A | 12/1981 | Pressiat et al. | |
| 4,652,082 A | 3/1987 | Warner | |
| 5,073,044 A | 12/1991 | Egner et al. | 385/86 |
| 5,097,524 A | 3/1992 | Wasserman et al. | 385/73 |
| 5,347,603 A | 9/1994 | Belenkiy et al. | 385/86 |
| 5,419,717 A | 5/1995 | Abendschein et al. | |
| 5,461,690 A | * 10/1995 | Lambert | 385/86 |
| 5,640,476 A | 6/1997 | Womack et al. | 385/86 |
| 5,710,851 A | 1/1998 | Walter et al. | |
| 5,781,681 A | 7/1998 | Manning | 385/86 |

FOREIGN PATENT DOCUMENTS

| EP | 0 213 672 | 8/1986 |
| GB | 2 032 130 | 5/1979 |
| JP | 10-78534 | 3/1998 |

OTHER PUBLICATIONS

Ito, Noboru, and Toshiaki Numazaki: Optical two–way communication system using a rotary coupler. In: Applied Optics, vol. 24, No. 14, pp. 2221–2224 (1985).

* cited by examiner

Primary Examiner—Javaid H. Nasri
(74) Attorney, Agent, or Firm—Armstrong, Kratz, Quintos, Hanson & Brooks, LLP

(57) ABSTRACT

An optical ring network, an optical connector, and a hybrid connector is provided, wherein a leading-out direction of an optical fiber can be changed without bringing about bad influence on the light transmitted with the optical fiber. An optical plug 24 as an optical connector includes a pair of ferrules 31 to be attached to the respective ends of a pair of optical fibers 25 and an optical adapter 32 having accommodating chambers 101 to accommodate the respective end portions of the optical fibers 25 with the respective ferrules 31. And, directing members 26, 27 to direct the respective optical fibers 25 led out of the optical adapter 32 are secured to the respective ferrules 31, and the ferrules 31 with the directing members 26, 27 are pivotably accommodated in the respective accommodating chambers 101.

2 Claims, 15 Drawing Sheets

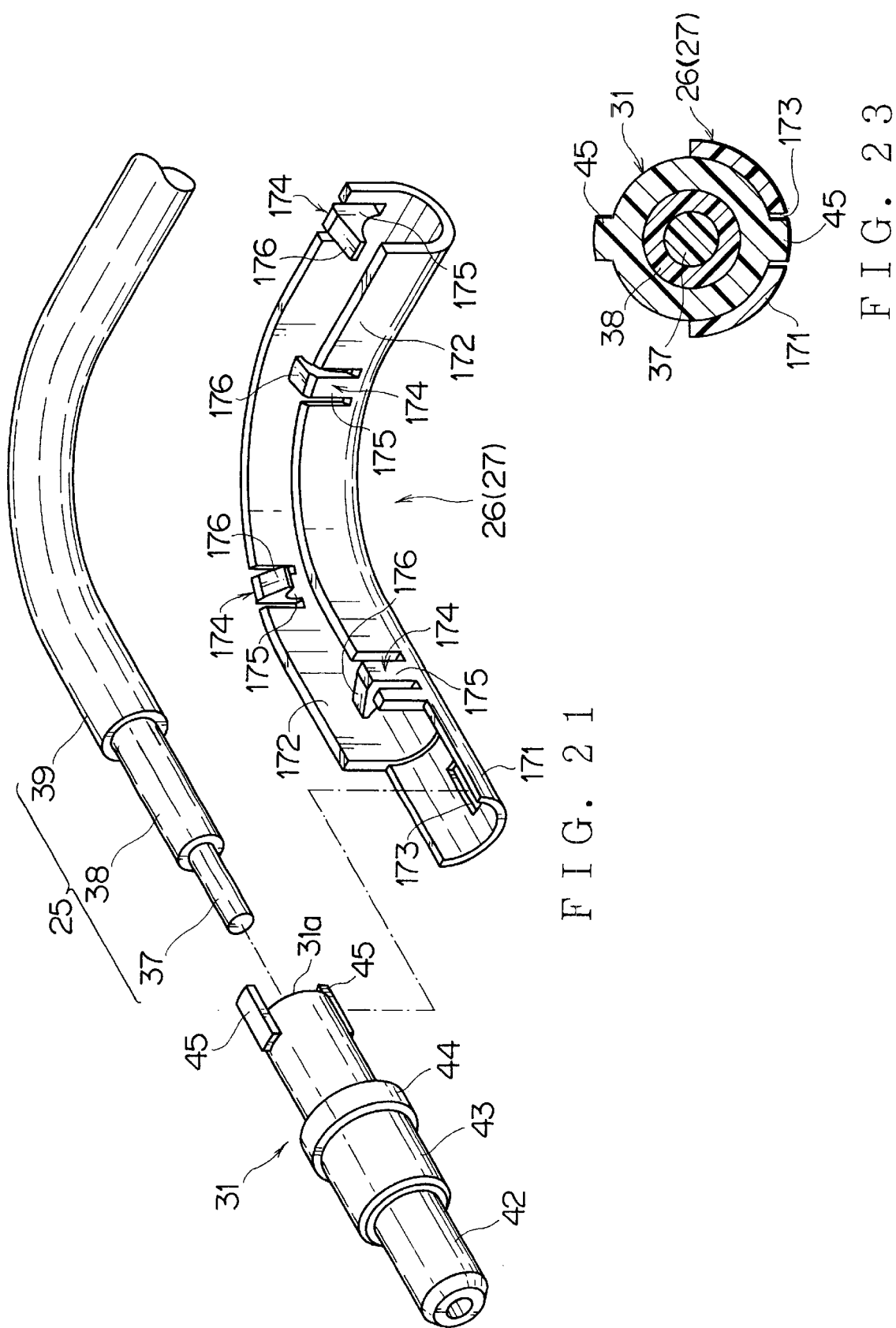

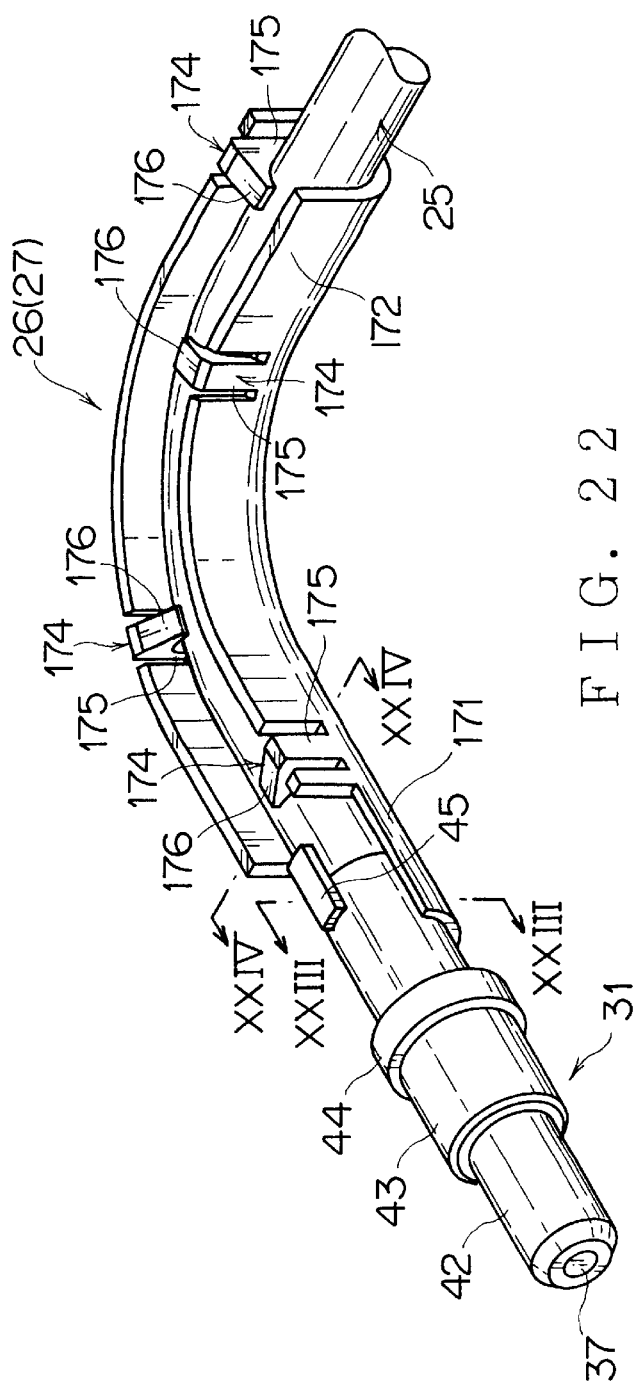

OPTICAL RING NETWORK, OPTICAL CONNECTOR, AND HYBRID CONNECTOR

This is a continuation-in-part application of application Ser. No. 09/557,084, filed Apr. 21, 2000, now U.S. Pat. No. 6,390,687.

BACKGROUND OF THE INVENTION

1. Field of the Invention

The present invention generally relates to an optical connector, and more particularly, to an optical ring network suitable for an optical fiber communication system in a vehicle such as motor vehicle and to an optical connector and a hybrid connector which are suitable for the optical ring network.

2. Description of the Related Art

In an optical ring network connecting processing units, the unit are connected with an optical fiber and an optical connector in series, and light (an optical signal) outputted from the units are transmitted successively and stored in an addressed unit.

An optical connector used in such an optical ring network is disclosed in Japanese Patent Application Laid-open No. 10-78534.

The above optical connector will now be described, referring to FIGS. 25–26.

An optical plug 1 as the above optical connector consists of a ferrule assembly 2, a plug housing 3 to accommodate the ferrule assembly 2, a spring cap 4 to fit in the plug housing 3 and to check coming-off of the ferrule assembly 2, and a directing member 5 to pivotably engage the spring cap 4, which optical plug 1 is connected to a receptacle 7 to be an optical connector on a side of a unit 6.

The ferrule assembly 2 consists of a plastic optical fiber 8, a ferrule 9 to be provided at an end of the optical fiber 8, and a spring 10 to be inserted into the optical fiber 8. When the ferrule assembly 2 is accommodated in the plug housing 3 and then the spring cap 4 fits in the plug housing 3, the ferrule 9 is pressed toward the receptacle 7 by means of the spring 10 whose one end abuts against the spring cap 4. A hole 11 in which the optical fiber 8 is inserted is formed on the spring cap 4. The hole 11 goes through a supporting wall 12 of the spring cap 4.

The directing member 5 has a base portion 13 bending by about 90 degrees in a circular-arc. A slipping ring 15 is provided on an end of the base portion 13 through a supporting groove 14. And, a holding portion 16 is projectingly provided on the other end of the base portion 13.

A radius of the base portion 13 is set to a minimum allowable bending radius of the optical fiber 8. A gap portion 17 to facilitate attachment is formed on the slipping ring 15. The optical fiber 8 is arranged in a circular-arc along a periphery of the base portion 13 between the holding portion 16 and the slipping ring 15.

In the above structure, the slipping ring 15 of the directing member 5 is fitted on the supporting wall 12 of the spring cap 4 and then a collar portion 18 of the spring cap 4 is inserted into the supporting groove 14 of the directing member 5, whereby the directing member 5 gets pivotable with respect to the supporting wall 12 of the spring cap 4. By turning the directing member 5 in a desirable position and by arranging the optical fiber 8 in a circular-arc along the periphery of the base portion 13 between the holding portion 16 and the slipping ring 15, the optical fiber 8 can be led out in a desirable direction.

In the above prior art, the optical fiber 8 led out from the hole 11 of the spring cap 4 is arranged along the base portion 13 of the directing member 5.

With respect to the above prior art, however, there should be the following problems when leading-out direction of the optical fiber 8 is changed.

That is, when the directing member 5 is turned while the optical fiber 8 is attached to the base portion 13, the optical fiber 8 gets twisted near the hole 11 of the spring cap 4, thereby causing attenuation of the light transmitted with the optical fiber 8.

Describing the above in a little further detail, diameter of the hole 11 is merely a little larger than that of the optical fiber 8 and also reaction force of bending of the optical fiber 8 acts on the hole 11, whereby the optical fiber 8 becomes hard to turn. Therefore, when the directing member 5 is quickly turned to change a leading-out direction of the optical fiber 8, distortion force acts on the optical fiber 8.

If the diameter of the hole 11 is enlarged, a diameter of the spring 10 which abuts against the vicinity of the hole 11 need to be enlarged, whereby the ferrule 9 and, as a result, the optical plug 1 becomes larger.

Or, if the optical fiber 8 is removed from the base portion 13 and then the optical fiber 8 is returned again after the directing member 5 is turned, the workability is not good.

The problems mentioned above occur not only in the optical ring network and in the optical connector but also in a hybrid connector in which an electric connector and an optical connector are integrated.

SUMMARY OF THE INVENTION

In view of the foregoing, an object of the present invention is to provide an optical connector capable of changing a leading-out direction of an optical fiber without hindering transmission of the light in the optical fiber, an optical ring network including the optical connector, and a hybrid connector.

In order to achieve the above-described object, as a first aspect of the present invention, an optical ring network includes: optical connectors attached to respective processing units; and optical fibers to connect the optical connectors in series in a ring, wherein at least one of the optical connectors includes: a ferrule provided at an end of the optical fiber; a housing having an accommodating chamber to pivotably accommodate an end portion, including the ferrule, of the optical fiber; and a directing member to be secured to the ferrule for directing the optical fiber led out from the housing.

As a second aspect of the present invention, in the structure with the above first aspect, the optical ring network further includes: a hybrid connector having an electric connector having an electrical housing; and an electric terminal to be accommodated in the electrical housing, wherein the optical connector having the ferrule to which the directing member is secured is fitted in the electrical housing.

As a third aspect of the present invention, an optical connector includes: an optical fiber; a ferrule provided at an end of the optical fiber; a housing having an accommodating chamber to pivotably accommodate an end portion, including the ferrule, of the optical fiber; and a directing member to be secured to the ferrule for directing the optical fiber led out from the housing.

As a fourth aspect of the present invention, in the structure with the above third aspect, the directing member is substantially cylindrical.

As a fifth aspect of the present invention, in the structure with the above fourth aspect, the directing member consists of a first casing and a second casing to couple with each other and a slip preventing means to prevent the first and second casings from slipping is provided on each of the first and second casings.

As a sixth aspect of the present invention, in the structure with the above third aspect, the directing member has a U-shaped cross section by having a circular arc portion and a pair of straight portions continuing from respective circumferential ends of the circular arc portion in parallel to each other and has an engaging portion to engage the optical fiber so as to restrict the optical fiber from separating from the circular arc portion.

As a seventh aspect of the present invention, in the structure with the above third aspect, the ferrule and the directing member have a displacement restricting means to restrict a relative displacement therebetween.

As an eighth aspect of the present invention, in the structure with the above third aspect, a plurality of said accommodating chambers are provided in the housing correspondingly to a plurality of said optical fibers and a plurality of said ferrule to which the respective directing members are secured are pivotably accommodated in the respective accommodating chambers.

As a ninth aspect of the present invention, in the structure with the above eighth aspect, each of the directing members has a different curvature.

As a tenth aspect of the present invention, a hybrid connector includes: the optical connector with any one of the above third to ninth aspects; and an electric connector having both of an electrical housing having a fitting portion for the optical connector and a plurality of electric terminals provided in the electrical housing.

According to the above-described structure of the present invention, the following advantages are provided.

(1) The optical ring network has the optical connector useful for connection of the units wherein a leading-out direction of the optical fiber led out from the optical connector have to be restricted. Because the directing member is secured to the ferrule and the ferrule is pivotable in the accommodating chamber, even if a leading-out direction is changed, distortion does not arise on the optical fiber. And, the leading-out direction of the optical fiber can be changed without bringing about bad influence on the light (i.e. an optical signal) with the optical ring network having the optical connector. Further, there exists no bad influence on the workability.

(2) The optical ring network has the hybrid connector useful for connection of the units wherein a leading-out direction of the optical fiber led out from the optical connector have to be restricted. Accordingly, this invention has the same effect as the above.

(3) Because the directing member is secured directly to the ferrule and the ferrule is pivotable with respect to the accommodating chamber, distortion of the optical fiber can be prevented. And, because a leading-out direction of the optical fiber can be easily changed, workability is improved. Consequently, the optical connector capable of changing a leading-out direction of the optical fiber without bringing about bad influence on the light (i.e. an optical signal) transmitted with the optical fiber. Further, there exists no bad influence on the workability.

(4) Because the directing member is secured to the ferrule and is formed cylindrically, the bent portion of the optical fiber can be protected in a preferable state.

(5) Because the directing member consists of the first and second casings and further the casings are provided with the slip preventing means, the bent portion of the optical fiber can also be protected in a preferable. And, workability in assembling the optical connector can be improved.

(6) A bent portion of the optical fiber can be protected in a suitably bent state without undesirable influence on the light (an optical signal) transmitted by the optical fiber. Further, since the optical fiber can be held by the engaging portions in turn, the optical fiber can be assembled to the directing member with better workability.

(7) Because a relative displacement between the directing member and the ferrule is restricted by the displacement restricting means, the ferrule and the directing member can be secured.

(8) Because a plurality of ferrules to which the respective directing members are secured are accommodated in the respective accommodating chambers pivotably, the optical connector having a plurality of optical fibers can be dealt with.

(9) Because the directing members are formed with respective curvature, degree of freedom of leading-out direction of the optical fiber can be increased. Also, handling of the optical fibers at its storage or transportation can be improved.

(10) The hybrid connector having the optical connector is provided, wherein the ferrule fixedly provided with the directing member is accommodated in the accommodating chamber of the housing of the optical connector. Accordingly, the hybrid connector which can change a leading-out direction of the optical fiber without bringing about bad influence on the light (i.e. an optical signal) transmitted with the optical fiber can be provided.

The above and other objects and features of the present invention will become more apparent from the following description taken in conjunction with the accompanying drawings.

BRIEF DESCRIPTION OF THE DRAWINGS

FIG. 21 is a perspective view showing a modified embodiment of the directing member of the optical connector in accordance with the present invention;

FIG. 22 is a perspective view showing an assembled state of the optical fiber and the directing member shown in FIG. 21;

FIG. 23 is a sectional view taken along a line xxiii—xxiii in FIG. 22;

FIG. 24 is a sectional view taken along a line xxiv—xxiv in FIG. 22;

DESCRIPTION OF THE PREFERRED EMBODIMENT

Figure 1:
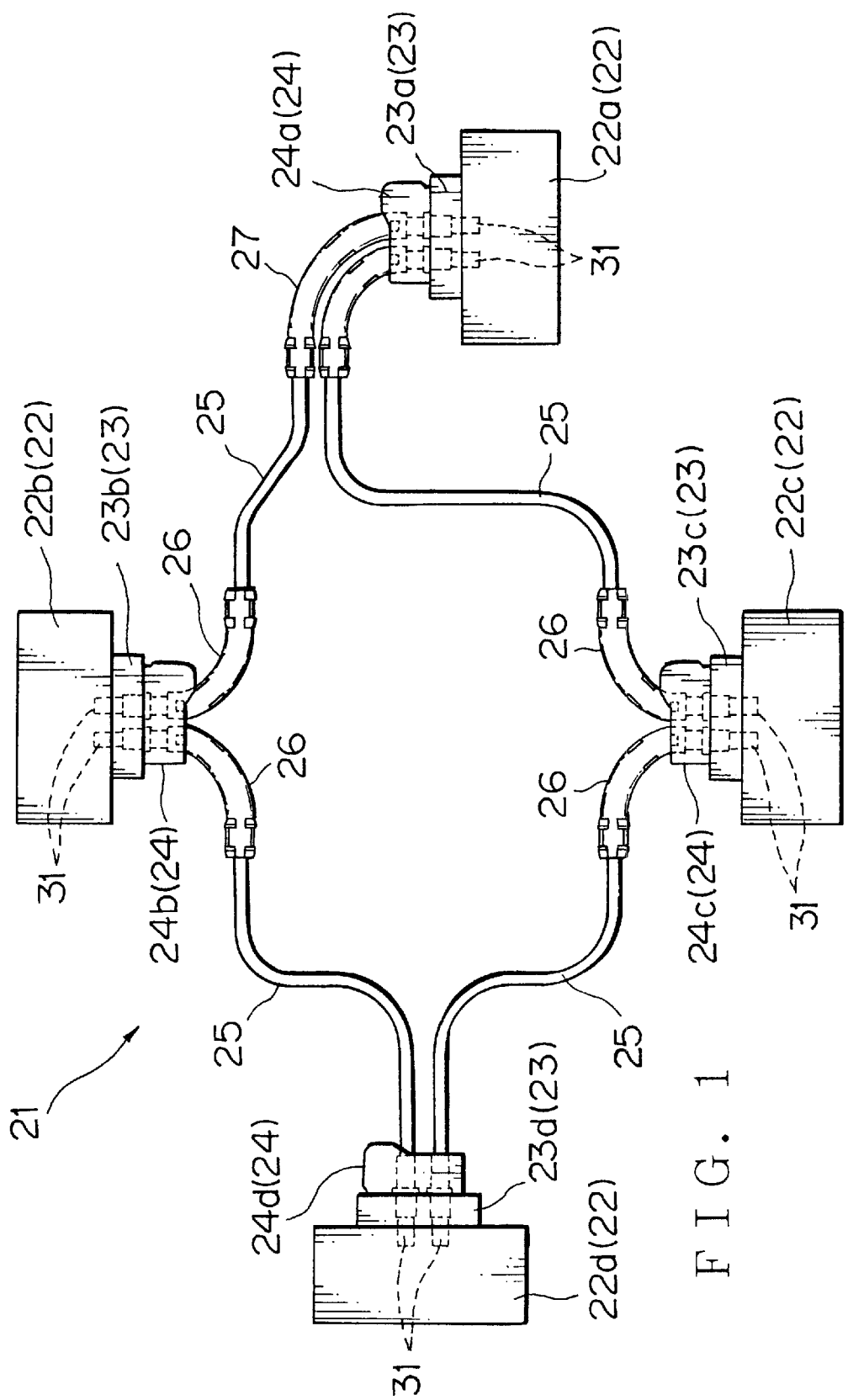
FIG. 1 is a plan view showing an embodiment of the optical ring network in accordance with the present invention.

Embodiments of the present invention will now be described in further detail with reference to the accompanying drawings. FIG. 1 is a plan view showing an embodiment of the optical ring network in accordance with the present invention.

Referring to FIG. 1, an optical ring network 21 is arranged at each part of a vehicle such as a motor vehicle.

The optical ring network has a first unit 22a to a n-th unit 22n (the units are given generic reference character 22) to carry out information processing or control processing in accordance with an algorithm designated in advance, receptacles 23a–23n (generic reference character 23), as optical connectors, to be provided on the respective units 22a–22n, optical plugs 24n–24a (generic reference character 24), as optical connectors, to be connected to the respective receptacles 23a–23n, and optical fibers 25a–25n (generic reference character 25) being led out from the optical plugs 24a–24n and forming a network in a ring. Four units are illustrated as an example here in FIG. 1.

The optical ring network 21 transmits an optical signal (i.e. the light, light beam) outputted from the upstream unit 22 to the downstream unit 22 in turn, and an optical signal is supplied to an addressed unit 22.

In the present embodiment, leading-out directions of the transmitting and receiving optical fibers 25 being led out from the optical plugs 24a–24c are limited for arrangement on a vehicle. Therefore, in the optical plugs 24a–24c applied to the optical ring network 21 of the present embodiment, directing members 26, 27 or 26, 26 are pivotably provided on the optical plugs 24a–24c.

Hereinafter, structure and action of the optical plug 24 having the directing members 26, 27 is described in detail.

Figure 2:
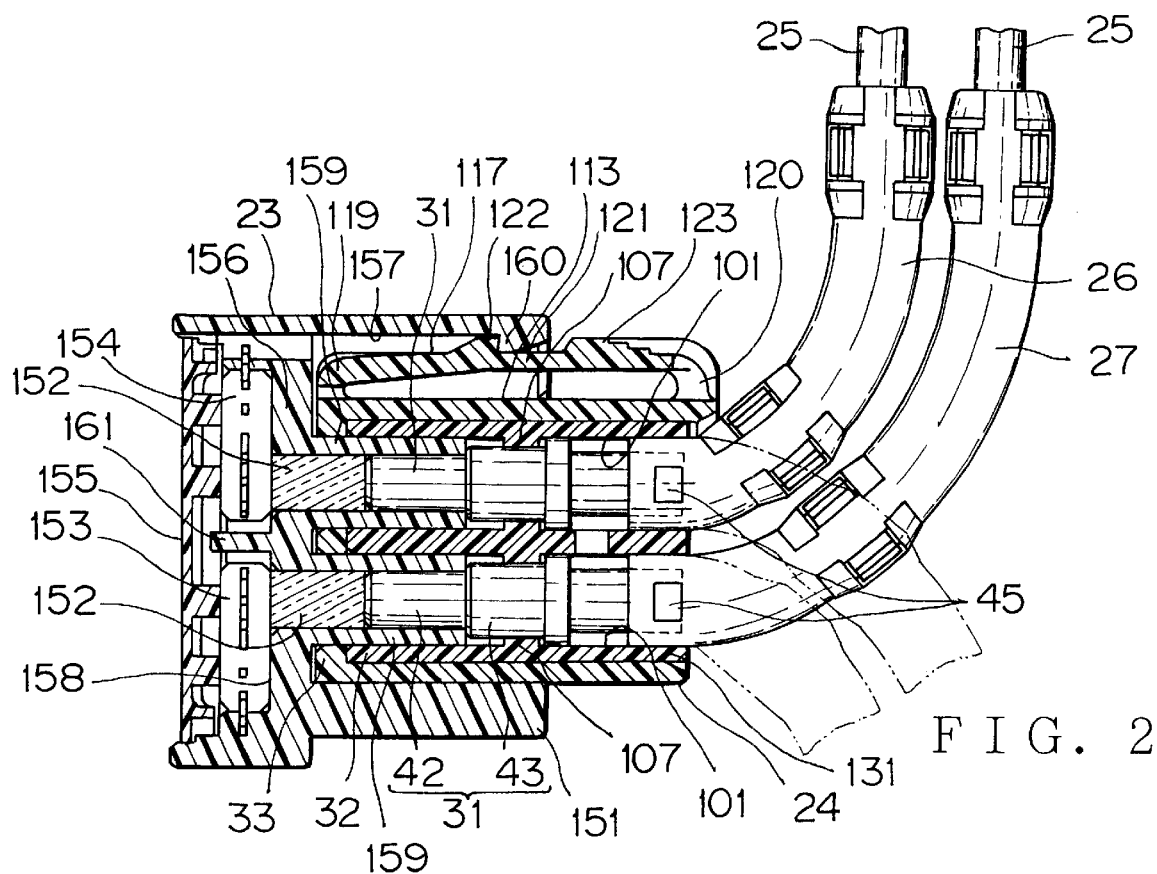
FIG. 2 is a sectional view showing an embodiment of the optical connector in accordance with the present invention.
Figure 3:
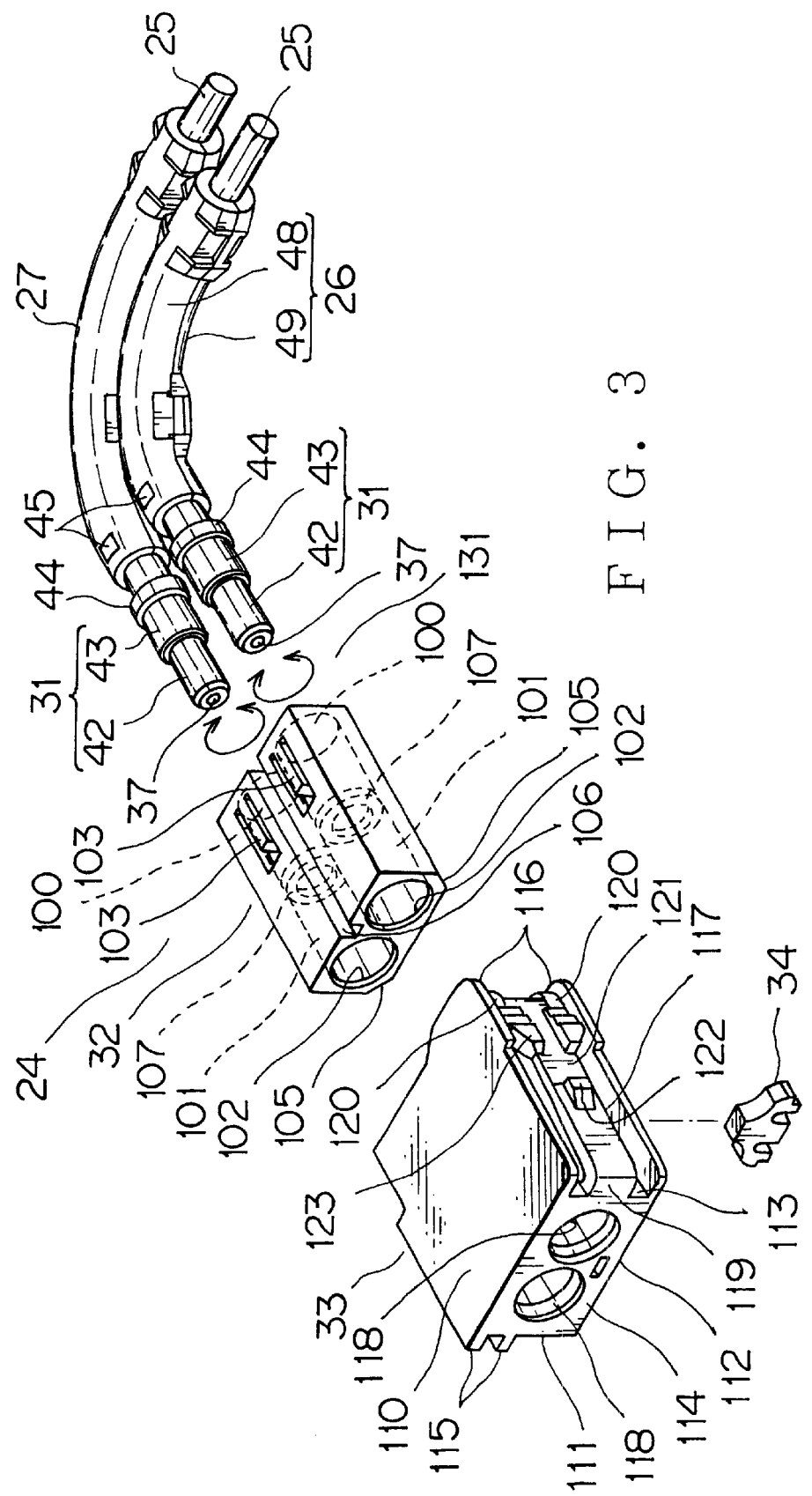
FIG. 3 is an exploded perspective view of the optical connector of FIG. 2.

FIG. 2 is a sectional view showing an embodiment of the optical connector in accordance with the present invention, and FIG. 3 is an exploded perspective view of the optical connector of FIG. 2.

As shown in FIG. 2 or FIG. 3, the optical plug 24 consists of a pair of ferrules 31 each attached to the end of the optical fiber 25, a directing member 26 secured to one ferrule 31 for directing the optical fiber 25, a directing member 27 secured to the other ferrule 31, an optical adapter 32 (i.e. a housing) to accommodate the ferrules 31 pivotably, an optical adapter cover 33 for covering the optical adapter 32, and a holder 34.

The receptacle 23 of the unit 22 (cf. FIG. 1) will be described later.

Figure 4:
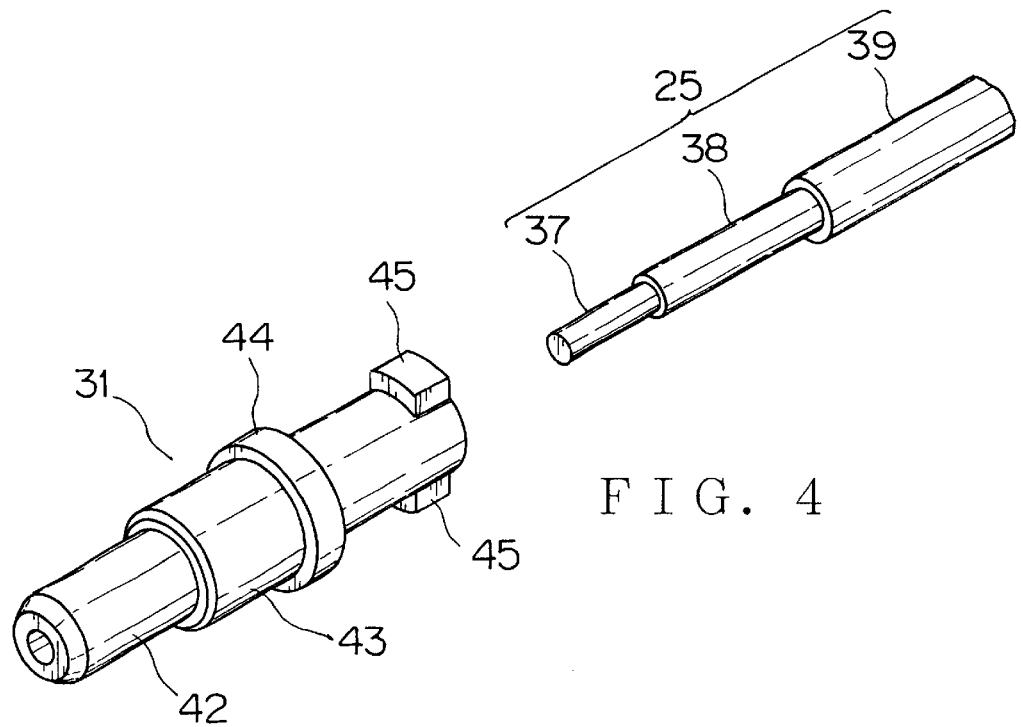
FIG. 4 is a perspective view of ferrules and optical fibers.

As shown in FIG. 4, the above optical fiber (called an optical fiber code or an optical fiber cable, for example) 25 consists of a plastic optical fiber 37, a primary sheathing 38 to cover the plastic optical fiber 37, and an outer secondary sheathing 39.

The plastic optical fiber (hereinafter, POF) 37 is a transmission channel to transmit an optical signal and has a circular cross section with a transparent core to propagate an optical signal at the center thereof. A transparent clad with a smaller refractive index than that of the core covers outside the core.

The primary sheathing 38 and the secondary sheathing 39 are made of insulative synthetic resin. The ends of the primary sheathing 38 and the secondary sheathing 39 are stripped off. The optical fiber 25 is formed to expose POF 37 and the primary sheathing 38 from their ends in turn.

The above ferrule 31, made of synthetic resin, has a small-diameter portion 42 to accommodate POF 37 and a large-diameter portion 43 continuing from the small-diameter portion 42 for accommodating the primary sheathing 38 and is a cylinder with a step portion in its inside and its outside.

POF 37 exposes from the end of the small-diameter portion 42. A pair of engaging projections 45 and a flange portion 44 are formed on the peripheral surface of the large-diameter portion 43. The flange portion 44 is formed near the center of the large-diameter portion 43 in a ring. And, the engaging projection 45 is formed at the end of the large-diameter portion 43 in a four-sided figure. The end of the engaging projection 45 is formed in an arc having the same radius as of the flange portion 44. The end of the secondary sheathing 39 abuts against an inside end face of the large-diameter portion 43.

The ferrule 31 and the optical fiber 25 are secured tightly with an adhesive or the like. Only the optical fiber 25 would not come out of the optical adapter 32.

Figure 5:
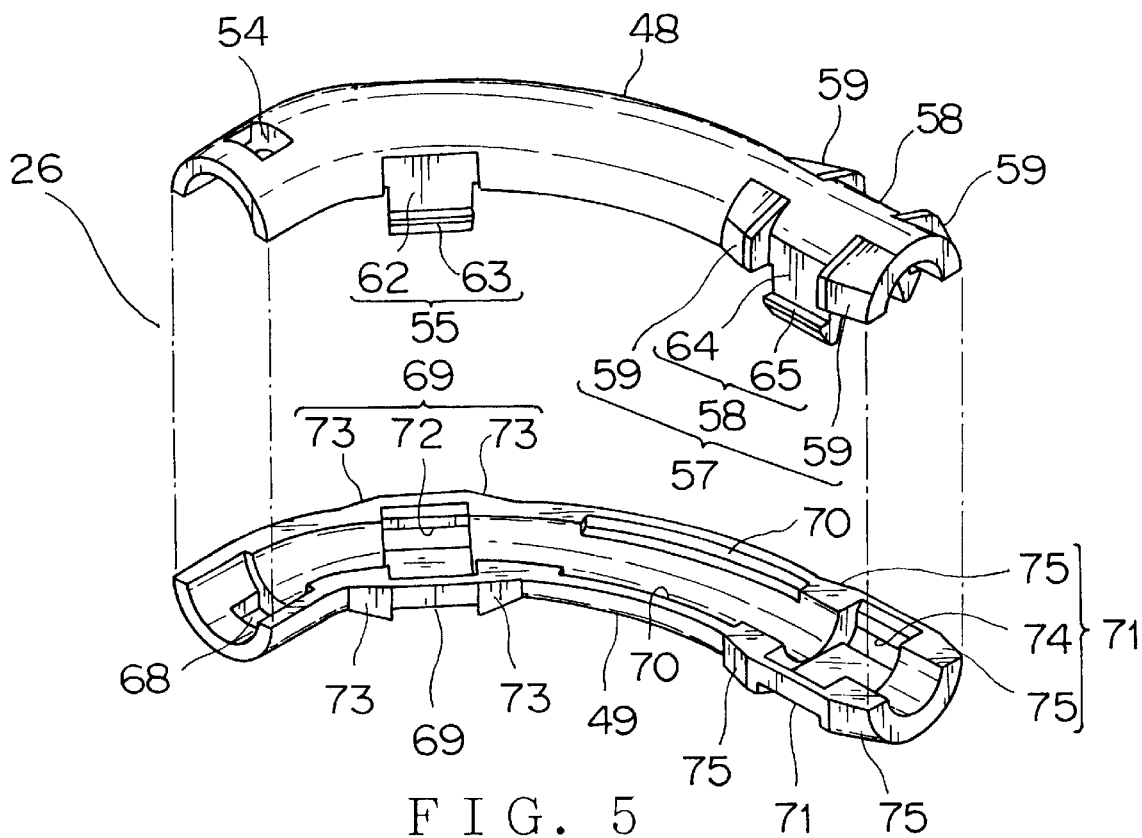
FIG. 5 is an exploded perspective view of a first directing member.
Figure 7:
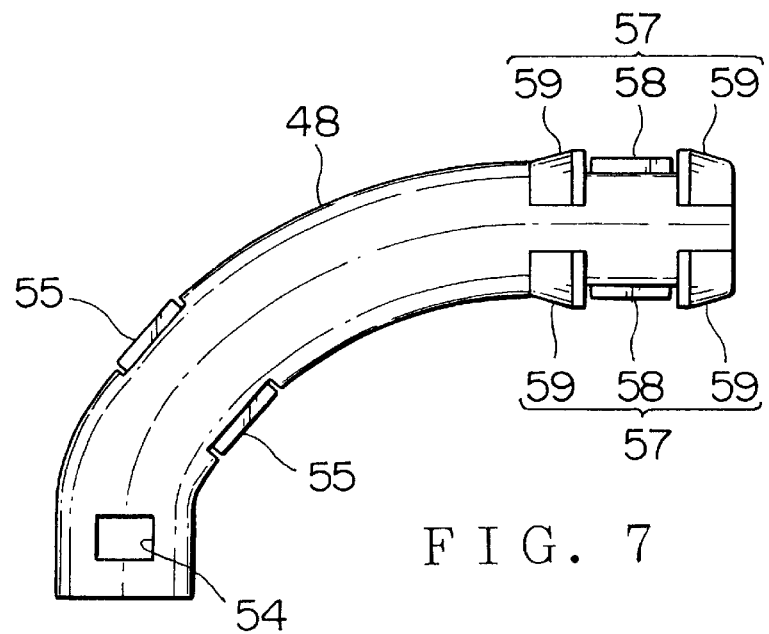
FIG. 7 is a plan view of a first casing of the first directing member.
Figure 6:
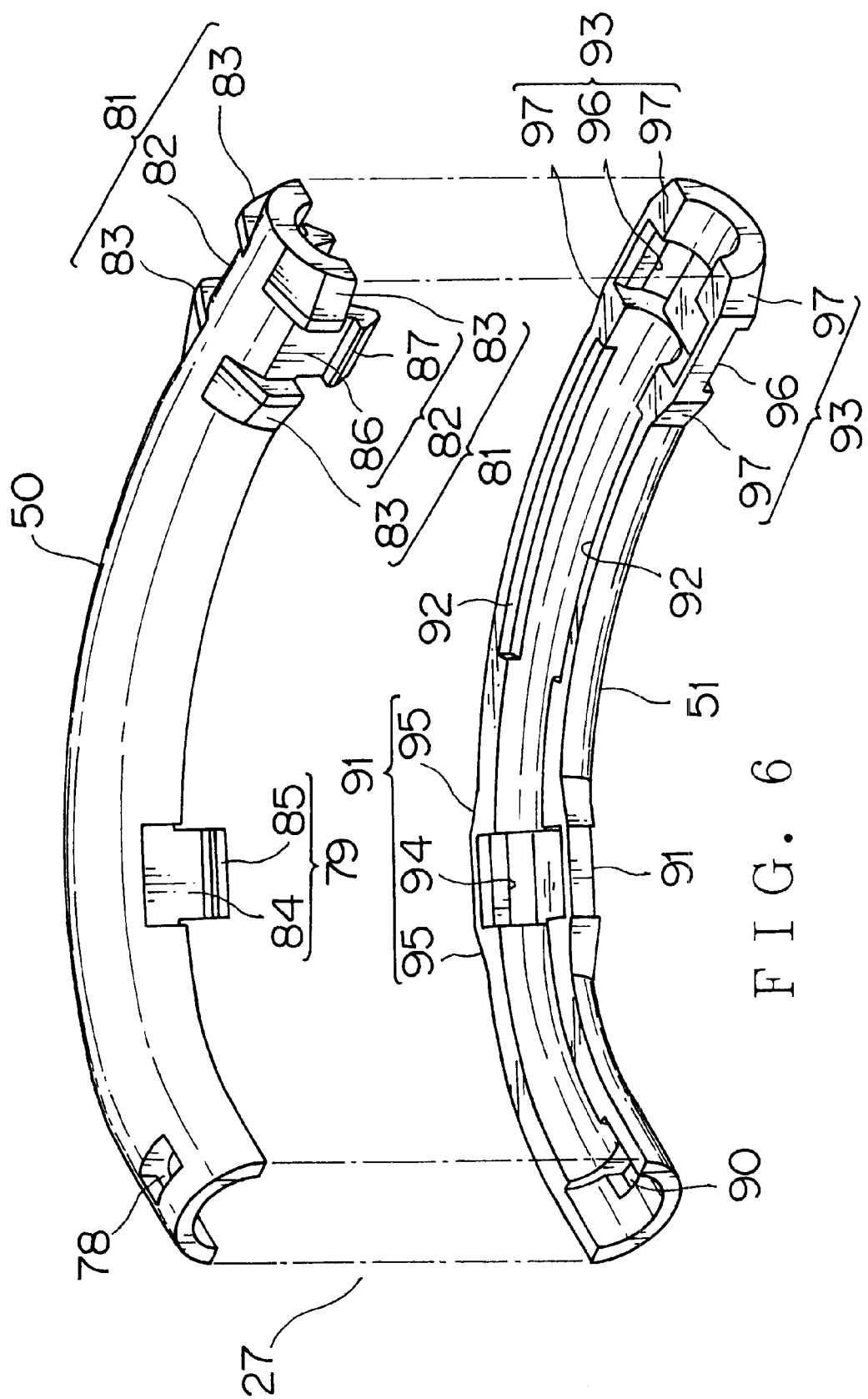
FIG. 6 is an exploded perspective view of a second directing member.
Figure 8:
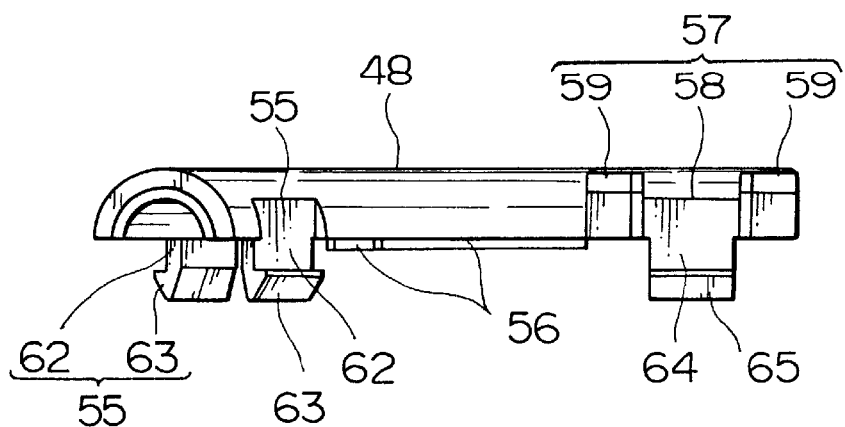
FIG. 8 is a front view of the first casing of the first directing member.
Figure 9:
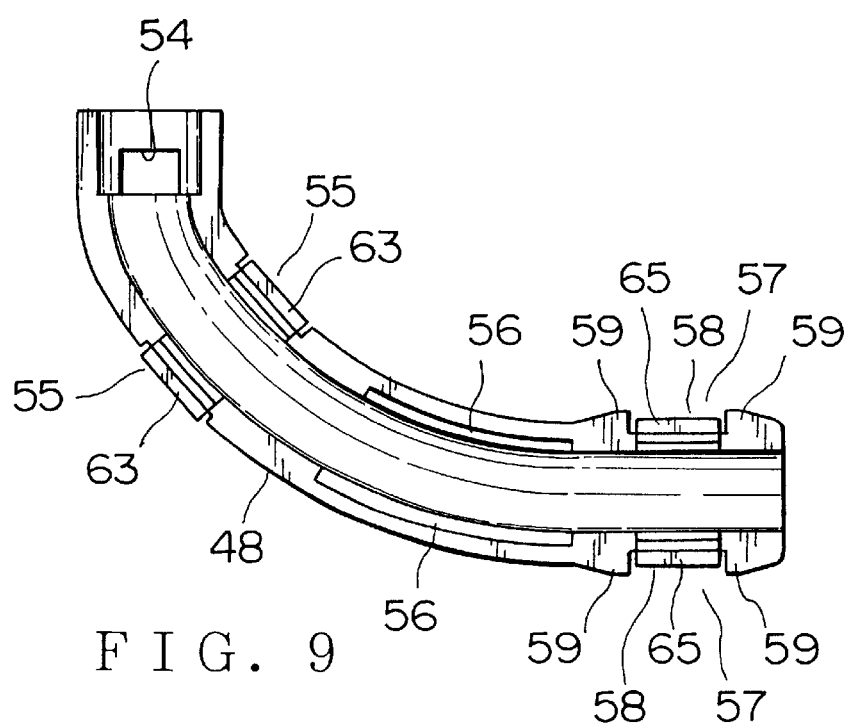
FIG. 9 is a bottom view of the first casing of the first directing member.
Figure 11:
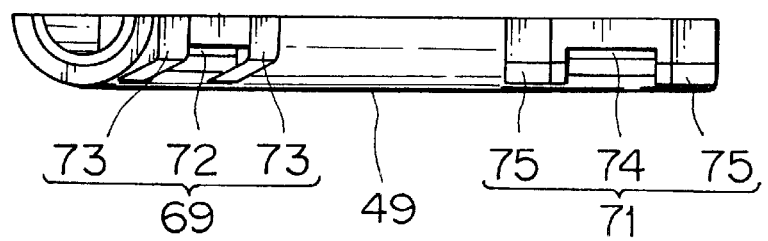
FIG. 11 is a front view of the second casing of the first directing member.
Figure 10:
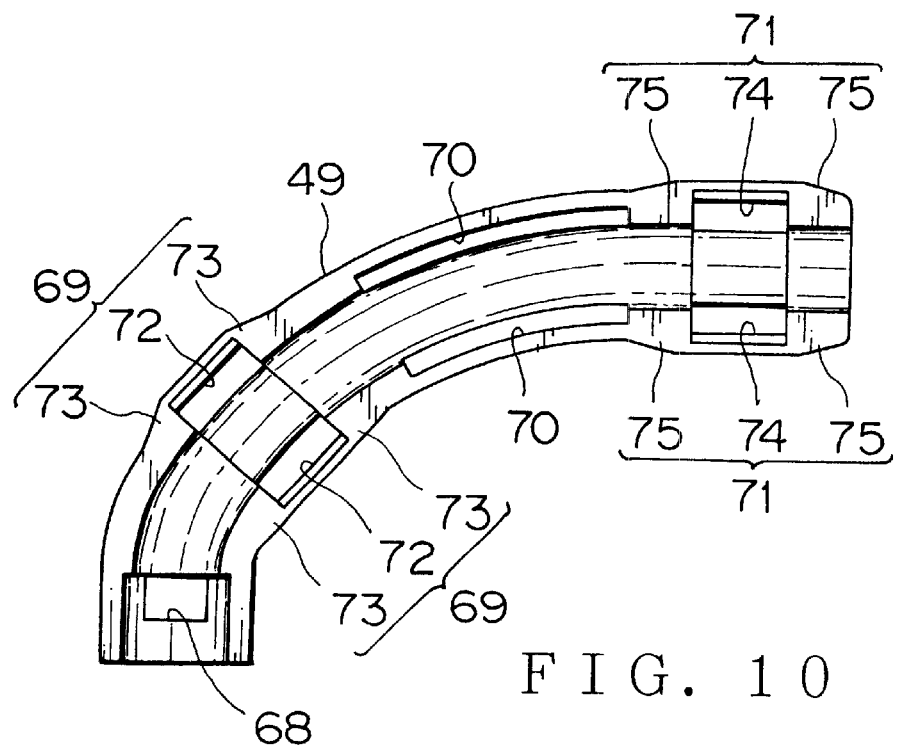
FIG. 10 is a plan view of the second casing of the first directing member.
Figure 12:
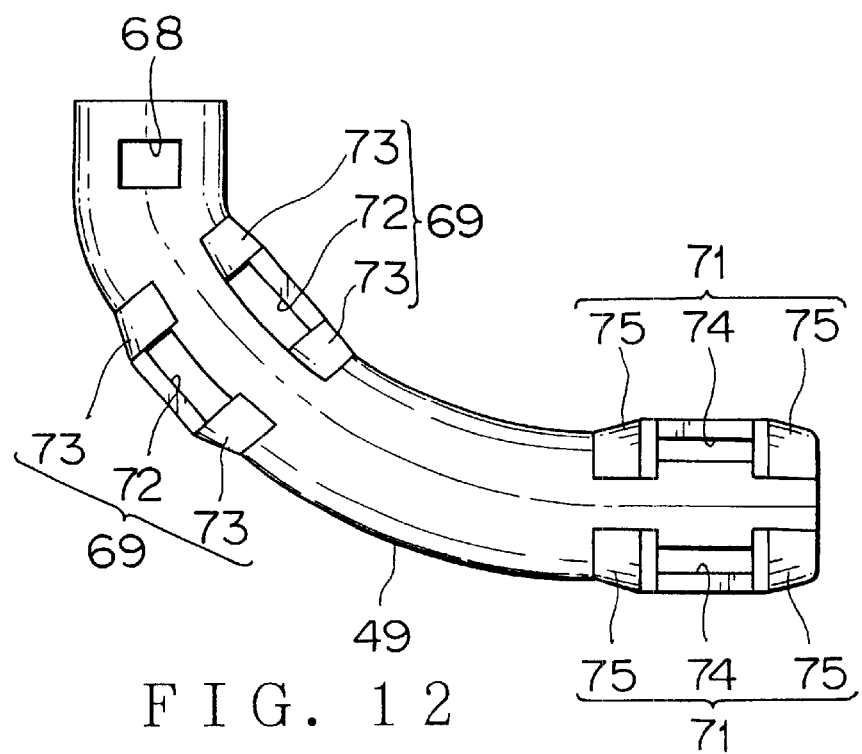
FIG. 12 is a bottom view of the second casing of the first directing member.
Figure 13:
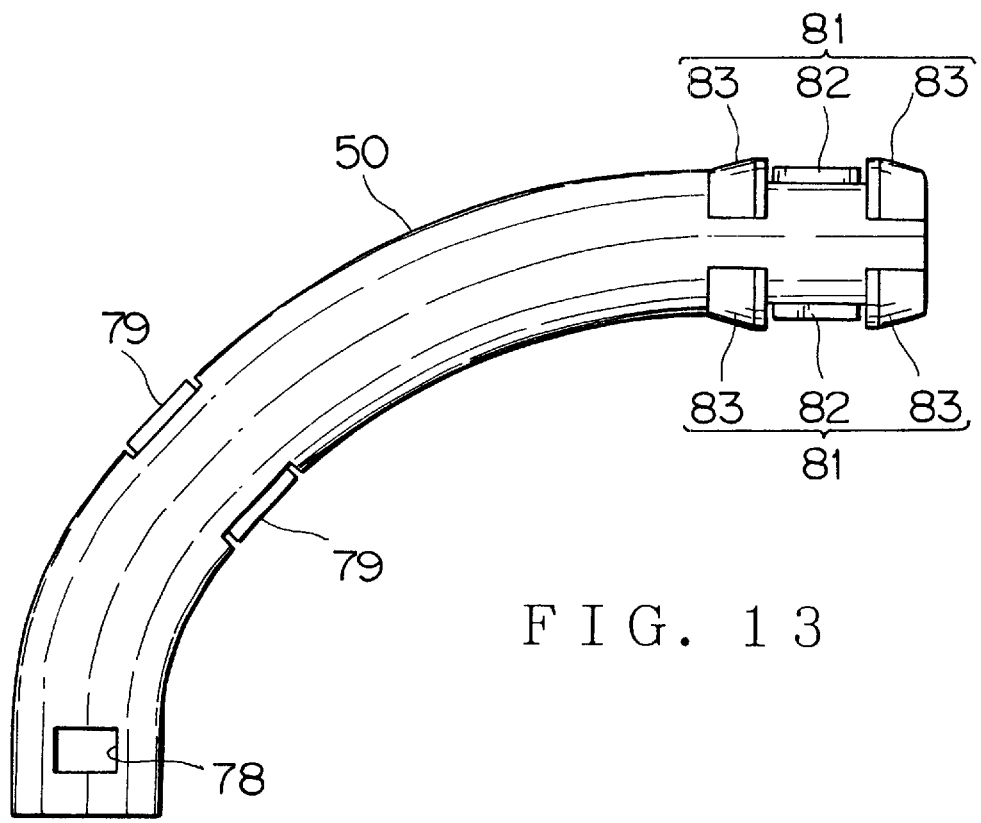
FIG. 13 is a plan view of the first casing of the second directing member.
Figure 14:
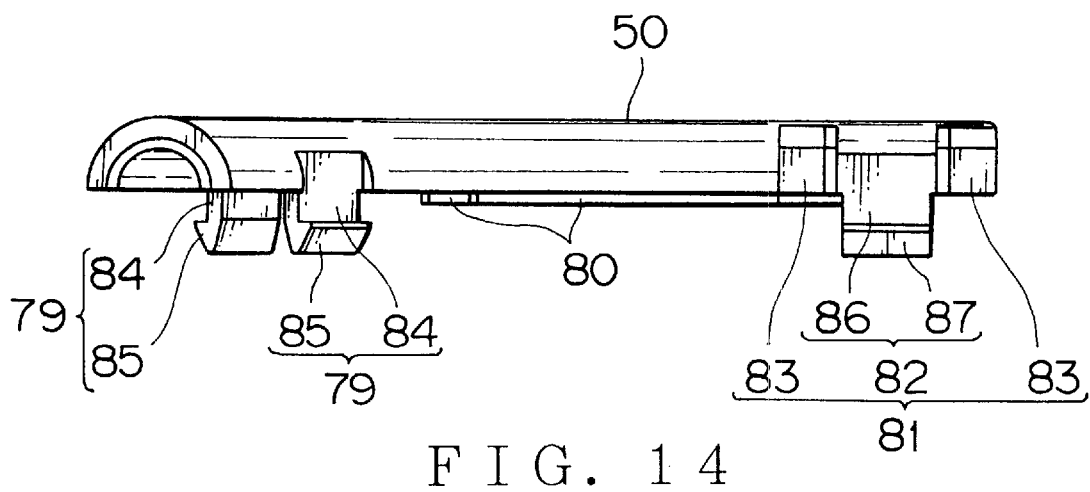
FIG. 14 is a front view of the first casing of the second directing member.
Figure 15:
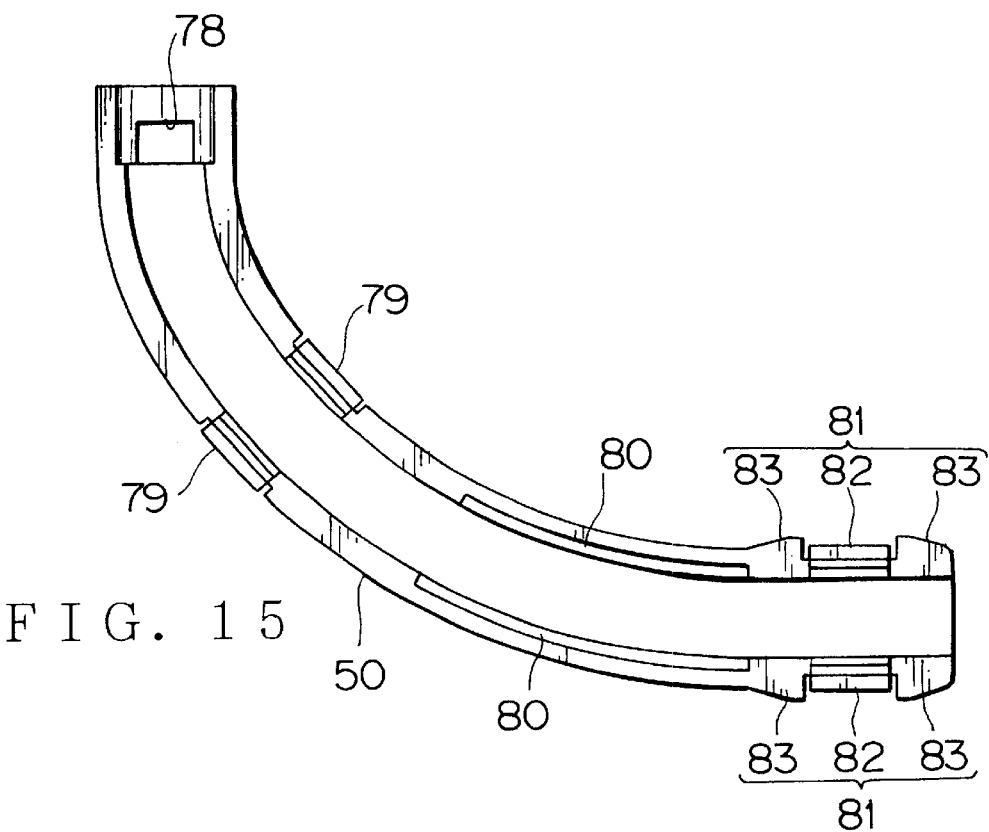
FIG. 15 is a bottom view of the first casing of the second directing member.
Figure 16:
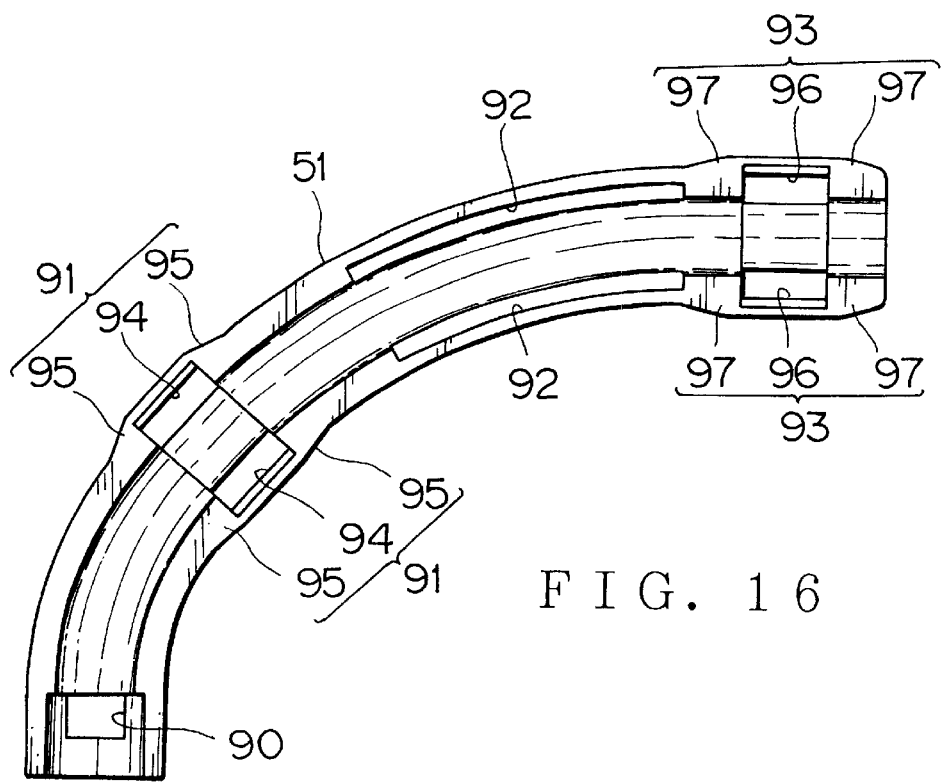
FIG. 16 is a plan view of the second casing of the second directing member.
Figure 17:
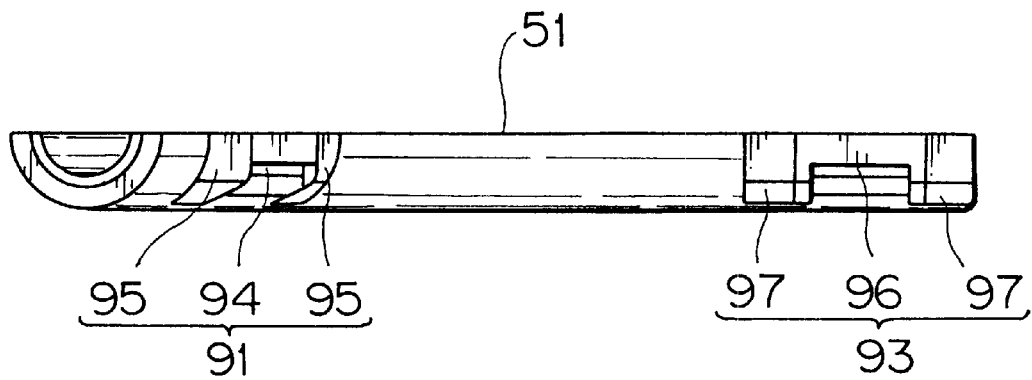
FIG. 17 is a front view of the second casing of the second directing member.
Figure 18:
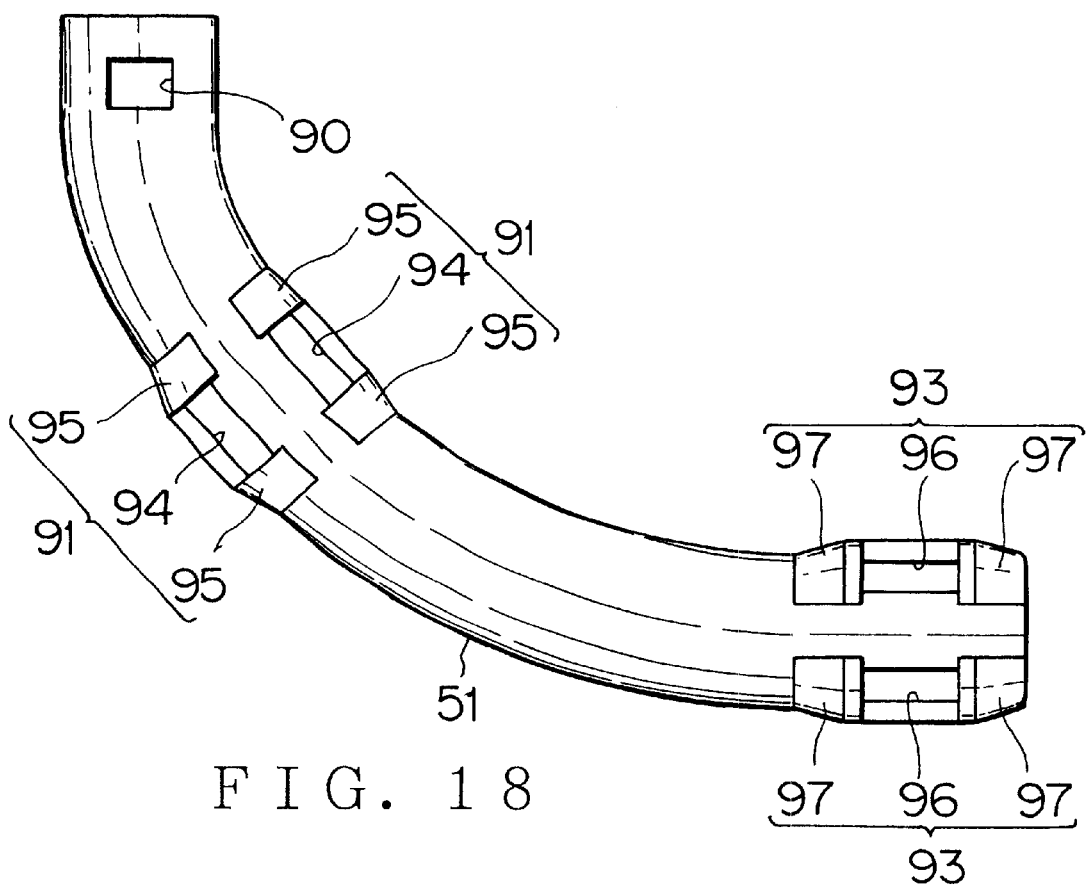
FIG. 18 is a bottom view of the second casing of the second directing member.

As shown in FIG. 5, the directing member 26, made of synthetic resin, is formed with a first casing 48 and a second casing 49 cylindrically. And, as shown in FIG. 6, the directing member 27 is also made of synthetic resin and is formed with a first casing 50 and is a second casing 51 cylindrically. A bending portion of the optical fiber 25 is protected in a desirable bending state in the cylindrical directing members.

As shown in any one of FIGS. 5, 7–9, the first casing 48 is formed in a shape of semi-cylinder. And, the first casing 48 bends by 90 degrees in the present embodiment. The bending angle can be changed. This is similar to the second casing 49, the first casing 50, and the second casing 51. A radius of an arc can be of an allowable smallest bending radius of the optical fiber 25 (POF 37). Formation of the first casing to meet a desirable leading-out direction is possible.

A hole 54 for fixation, a pair of engaging claws 55, a pair of laterally-long projections 56 as a slip preventing means, and a pair of engaging portions 57 are formed on the first casing 48 from one end surface to the other end surface in order. Each of the engaging portions 57 has an engaging claw 58 and protecting portions 59 arranged on both sides of the engaging claw 58.

The hole 54 is formed at a portion close to the above one end surface. And, the hole 54 is formed in a four-sided figure to engage the engaging projection 45 (cf. FIG. 4) of the ferrule 31. Inside diameter of the portion having the hole 54 has almost the same diameter as an outside diameter of the large-diameter portion 43 (cf. FIG. 4) of the ferrule 31. Inside diameter of the other portion of the first casing 48 basically corresponds to the outside diameter of the secondary sheathing 39 (cf. FIG. 4).

The portion having the hole 54 is formed in straight. This applies to the second casing 49, the first casing 50, and the second casing 51.

The engaging claw 55 is formed on a portion close to the hole 54. And, the engaging claw 55 consists of a resilient base portion 62 and a claw portion 63 projecting from the end portion of the base portion 62. The base portion 62 is formed in a piercing direction of the hole 54. The claw portion 63 has a triangular longitudinal section.

The laterally-long projection 56 is formed along the inside surface of the first casing 48. And, the laterally-long projection 56 is much lower than the base portion 62 of the engaging claw 55. Grooves 70 (describe later) engage the respective laterally-long projection 56 for preventing a slip of the casings 48, 49.

The engaging portion 57 is formed near the other end surface described above. And, a pair of protecting portions 59 continue to the other end surface. The engaging claw 58 has a resilient base portion 64 and a claw portion 65 formed at the end of the base portion 64. The base portion 64 is formed in the same direction as the base portion 62 of the engaging claw 55. The claw portion 65 has a triangular longitudinal section. The lateral side portion of the protecting portion 59 is positioned outside the claw portion 65. Two pairs of protecting portions 59 ensures an engagement of the engaging claws 58.

As shown in any one of FIGS. 5, 10–12, the second casing 49 is formed in a shape of semi-cylinder and engages the first casing 48. And, the second casing 49 bends by 90 degrees in the present embodiment.

A hole 68 for fixation, a pair of first engaging portions 69, a pair of grooves 70 as a slip preventing means, and a pair of second engaging portions 71 are formed on the second casing 49 from one end surface to the other end surface in order.

The hole 68 is formed at a portion close to the above one end surface. And, the hole 68 is formed in a four-sided figure to engage the engaging projection 45 (cf. FIG. 4) of the ferrule 31. Inside diameter of the portion having the hole 68 has almost the same diameter as an outside diameter of the large-diameter portion 43 (cf. FIG. 4) of the ferrule 31. Inside diameter of the other portion of the second casing 49 basically corresponds to the outside diameter of the secondary sheathing 39 (cf. FIG. 4).

Each of the first engaging portions 69 has a hole 72 to engage the engaging claw 55 of the first casing 48 and a pair of protecting portions 73 projectingly formed around the hole 72. The engaging hole 72 has a rectangular cross-section and is bored through the first engaging portion 69. The protecting portion 73 is formed in the same way as the protecting portion 59 of the first casing 48.

The groove 70 is formed so that the laterally-long projection 56 of the first casing 48 enters engagingly. Each of the second engaging portions 71 has a hole 74 to engage the engaging claw 58 of the first casing 48 and a pair of protecting portions 75 projectingly formed around the hole 74. The engaging hole 74 has a rectangular cross-section and is bored through the second engaging portion 71. The protecting portion 75 is formed in the same way as the protecting portion 59 of the first casing 48.

As shown in any one of FIGS. 6, 13–15, the first casing 50 is formed in a shape of semi-cylinder. And, the first casing 50 bends by 90 degrees in the present embodiment. The first casing 50 has a bigger bending radius than that of the first casing 48 of the directing member 26.

A hole 78 for fixation, a pair of engaging claws 79, a pair of laterally-long projections 80 as a slip preventing means, and a pair of engaging portions 81 are formed on the first casing 50 from one end surface to the other end surface in order. Each of the engaging portions 81 has an engaging claw 82 and protecting portions 83 arranged on both sides of the engaging claw 82.

Description about the above parts is omitted because these are similar to those of the first casing 48 of the directing member 26 though reference characters are different. Reference characters 84 and 86 designate base portions, and 85 and 87 designate claw portions each projecting from the respective ends of the base portions 84 and 86.

As shown in any one of FIGS. 6, 16–18, the second casing 51 is formed in a shape of semi-cylinder. And, the second casing 51 bends by 90 degrees in the present embodiment. The second casing 51 has a bigger bending radius than that of the second casing 49 of the directing member 26.

A hole 90 for fixation, a pair of first engaging portions 91, a pair of grooves 92 as a slip preventing means, and a pair of second engaging portions 93 are formed on the second casing 51 from one end surface to the other end surface in order.

Description about the above parts is omitted because these are similar to those of the second casing 49 of the directing member 26 though reference characters are different. Reference characters 94 and 96 designate engaging holes, and 95 and 97 designate protecting portions.

The above optical adapter 32, made of synthetic resin, has a shape in which two rectangular solids are joined as shown in FIG. 2 or FIG. 3; therefore, the optical adapter 32 is symmetric with its longitudinal axis.

The optical adapter 32 has a pair of insertion openings 100 facing the respective ends of the optical fibers 25, a pair of accommodating chambers 101, and a pair of connection openings 102.

On the peripheral surface of the optical adapter 32, a pair of engaging portions 103, an engaging hole (not illustrated) for a holder 34, and a recess (not illustrated) for engagement are formed. And, one groove 106 and a pair of tapered planes 105 are also formed on the peripheral surface of the optical adapter 32 in a longitudinal direction thereof.

The optical fiber 25 with the ferrule 31 is inserted into the insertion opening 100, and the insertion opening 100 connects with an accommodating chamber 101. The diameter of the insertion opening 100 is a little larger than that of the flange portion 44. A pair of insertion openings 100 are arranged alongside each other laterally.

The accommodating chamber 101 is longer than the ferrule 31 so that the small-diameter portion 42 of the ferrule 31 accommodated therein does not project from the connection opening 102, whereby damage of the end of the ferrule 31 is prevented and simultaneously the end face of POF 37 is protected. The accommodating chamber 101, the insertion opening 100 and the connection opening 102 have the same diameter, and an inwardly projecting circular stopper 107 is provided in the middle of the accommodating chamber 101. The flange portion 44 of the ferrule 31 abuts against the stopper 107.

The connection opening 102 is formed in a circle on the other end surface of the optical adapter 32. And, the connection opening 102 relates to the connection with the receptacle 23. The connection opening 102 continues to the accommodating chamber 101.

The engaging portions 103 are formed on the side of the groove 106 on the optical adapter 32 and are positioned close to the insertion openings 100. And, the engaging portion 103 engages the flange portion 44 of the ferrule 31, whereby coming-off of the ferrule 31 is prevented. The projection (not illustrated) projecting inside the accommodating chamber 101 is formed at the end of the engaging portion 103. The engaging portion 103 has resilience.

The engaging hole (not illustrated) for the holder 34 is formed in a rectangle on the opposite surface having the engaging portion 103 and communicates with the accommodating chamber 101. When the holder 34 is inserted into the engaging hole (not illustrated), the holder 34 engages the flange portions 44 of the accommodated ferrules 31. That is, the ferrules 31 are engaged double. Axial movement of the ferrule 31 is checked by the stopper 107, the engaging portion 103 and the holder 34, but the ferrule 31 is capable of turning.

The tapered plane 105 is formed by cutting off a corner on a side of the engaging hole (not illustrated). The tapered planes 105 define the assembly of the optical adapter 32 vertically.

The groove 106 is formed between a pair of engaging portions 103 and is parallel with the longitudinal axis of the optical adapter 32. The groove 106 functions as a guide.

The optical adapter cover 33, made of synthetic resin, is formed in a box-shape to accommodate the optical adapter 32.

That is, the optical adapter cover 33 has four walls parallel to an inserting direction of the optical adapter 32. More specifically, the optical adapter cover 33 has an upper wall 110, a left wall 111 continuing from the upper wall 110, a lower wall 112 continuing from left wall 111, and a right wall 113 continuing to both of the lower wall 112 and the upper wall 110, and also has a front wall 114.

Rear end of each of the upper wall 110 and the lower wall 112 is cut out a little toward the front wall 114 so that a part of the optical adapter 32 accommodated in the optical adapter cover 33 exposes, whereby the workability is improved. A pair of guide ribs 115 are formed on the left wall 111 of the optical adapter cover 33. And, a pair of guide ribs 116 are formed on the right wall 113, and a lock portion 117 is formed therebetween. Another engaging hole (not illustrated) for the holder 34 is formed on the lower wall 112.

A pair of connection openings 118 are formed on the front wall 114 of the optical adapter cover 33. The front wall 114 functions as a stopper of the optical adapter 32. Inside the optical adapter cover 33, a guide rib (not illustrated) to guide the optical adapter 32, a projecting portion (not illustrated) to engagingly enter a recess (not illustrated) of the optical adapter 32, and a pair of tapered planes (not illustrated) corresponding to a pair of tapered planes 105 of the optical adapter 32 are formed.

One of the guide ribs 115 projects from the top end of the left wall 111 and the other one projects from the middle portion of the left wall 111. The former guide rib 115 continues from the upper wall 110. The guide rib 115 is lower than the guide rib 116.

The guide ribs 116 project from the respective upper and lower ends of the right wall 113 and continue from the respective upper and lower walls 110, 112. The guide ribs 116 have a height enough to protect the lock portion 117.

The lock portion 117 consists of a front base portion 119 continuing from the front wall 114, a pair of rear base portions 120 continuing from the rear end, and a resilient portion 121 formed on the right wall 113.

The resilient portion 121 has a thin wall substantially at the center. And, a claw-like engaging projection 122 is formed on the resilient portion 121. A pushed-portion 123 is formed on the rear base portion 120 side of the resilient portion 121. The pushed-portion 123 has a plurality of steps.

The resilient portion 121 bends toward a surface of the right wall 113 when the pushed-portion 123 is pushed, whereby engagement of the engaging projection 122 is released.

This engaging hole (not illustrated) is formed in the same size as the engaging hole (not illustrated) of the optical adapter 32. The holder 34 is inserted through this engaging hole. The holder 34 engages both flange portions 44 of the respective ferrules 31.

The connection openings 118 are circular and have the same diameter of the respective connection openings 102 of the optical adapter 32 and also the same pitch. The guide rib (not illustrated) is formed on an inside surface of the upper wall 110 in the center thereof in the axial direction. The guide rib engagingly enters the groove 106 of the optical adapter 32.

Next, assemblage of the optical plug 24 will be described.

As shown in FIG. 2 or FIG. 3, first, the ferrules 31 are attached to the respective optical fibers 25, and the directing members 26, 27 are secured to the respective ferrules 31. At this time, the first casing 48 and the second casing 49 of the directing member 26 fit each other and the engaging projections 45 of the ferrules 31 engage the respective holes 54, 68. And, the first casing 50 and the second casing 51 of the directing member 27 fit each other and the engaging projections 45 of the ferrules 31 engage the respective holes 78, 90.

Secondary, both of the ferrules 31 are accommodated in the optical adapter 32.

At this time, the ferrules 31 are accommodated in the accommodating chambers 101 through the insertion openings 100. The ferrules 31 are pushed into the accommodating chambers 101 until the flange portions 44 abut against the stoppers 107.

After the ferrules 31 have been accommodated in the accommodating chambers 101, the respective engaging portions 103 bend once outward and return and then the engaging portions 103 engage the flange portions 44 of the ferrules 31. Back-and-forth movement of the ferrules 31 is checked inside the accommodating chambers 101, but the ferrules are pivotable therein.

In other words, a leading-out direction of each of the optical fibers 25 can be changed easily by turning the respective directing members 26, 27. Torsional stress does not arise in the optical fibers 25 even if the directing members 26, 27 are turned by 360°.

That is, because the directing members 26, 27 are secured to the respective ferrules 31 which are pivotable in the respective accommodating chambers 101, distortion does not arise on the optical fibers 25.

Following the above, work wherein the optical adapter 32 is accommodated in the optical adapter cover 33 to thereby assemble the optical plug 24 as an optical connector 131 is carried out.

That is, when the optical adapter 32 is accommodated in the optical adapter cover 33, a recess (not illustrated) of the optical adapter 32 engages a projecting portion (not illustrated) of the optical adapter cover 33 thereby to engage the optical adapter 32 with the optical adapter cover 33. From this state, double locking of both the ferrules 31 and double locking of the optical adapter 32 are executed by inserting the holder 34 into the engaging hole (not illustrated). With the above, the assembly process of the optical plug 24 is completed.

As described referring to FIGS. 1–18, the optical ring network 21 has the optical plug 24 useful especially in a case where a leading-out direction of the optical fiber 25 from the optical plug 24 needs to be restricted. And, workability for arrangement is improved because a leading-out direction of the optical fiber 25 can be easily changed.

Figure 19A:
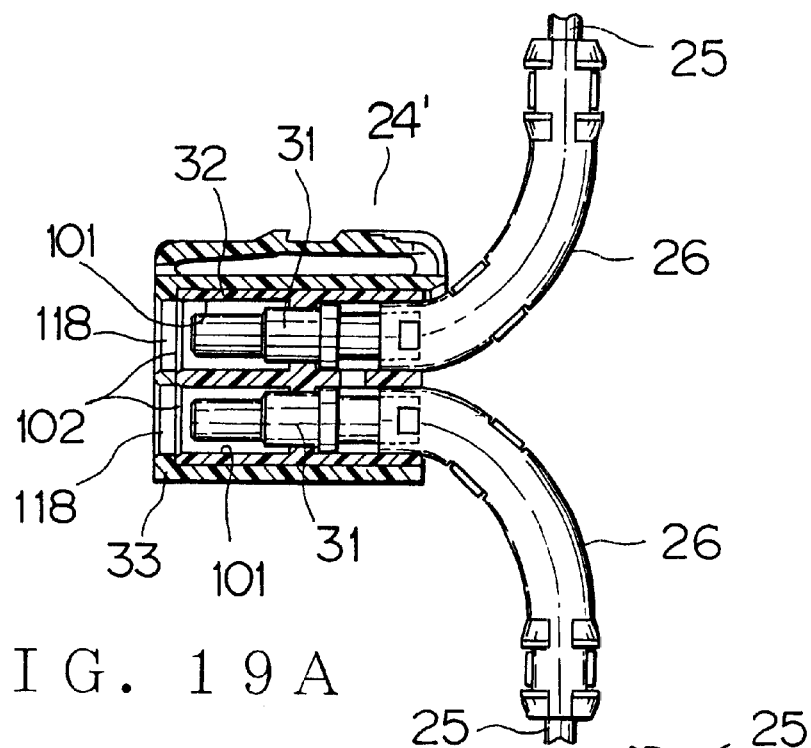
FIG. 19A is a sectional view of the optical connector showing an example of a leading-out direction of the optical fiber, wherein two first directing members are used.
Figure 19B:
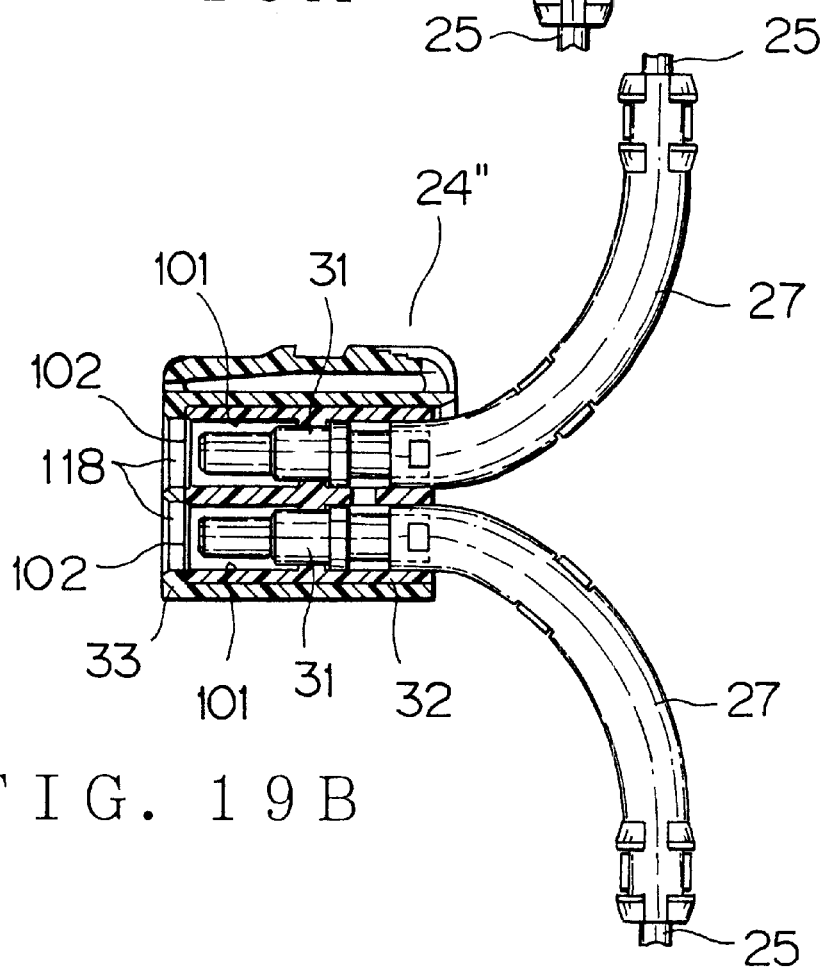
FIG. 19B is a sectional view of the optical connector showing an example of a leading-out direction of the optical fiber, wherein two second directing members are used.

Further, an optical plug as an optical connector can be formed even if a pair of directing members are put together as shown in FIGS. 19A, 19B. That is, in the optical plug 24', the directing members 26, 26 are attached to the respective ferrules 31. And, in the optical plug 24'', the directing members 27 are attached to the respective ferrules 31. Though the above optical plugs 24, 24', 24'' each have a pair of optical fibers 25, a structure having a single optical fiber or plural optical fibers may be adopted similarly to the prior art. In such cases, the corresponding number of accommodating chambers 101 are provided.

Figure 20:
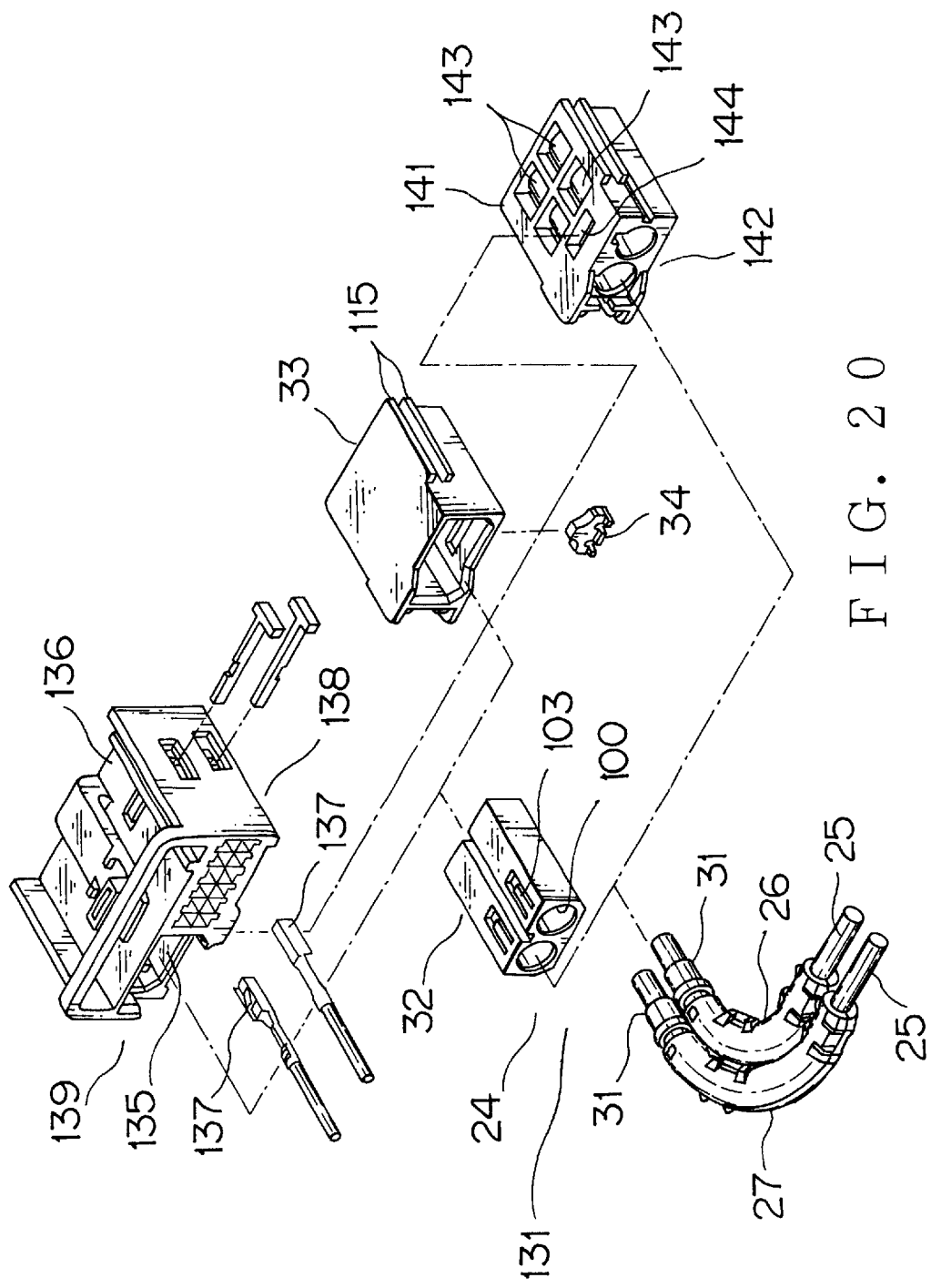
FIG. 20 is an exploded perspective view showing the optical connector and a hybrid connector in accordance with the present invention.
Figure 25:
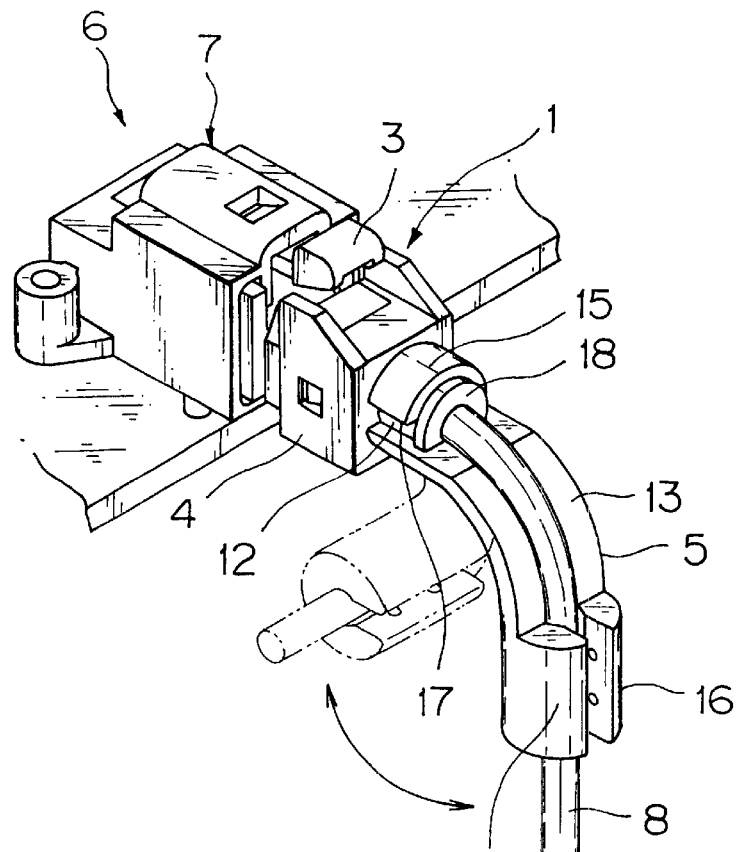
FIG. 25 is a perspective view of a prior art optical connector.
Figure 26:
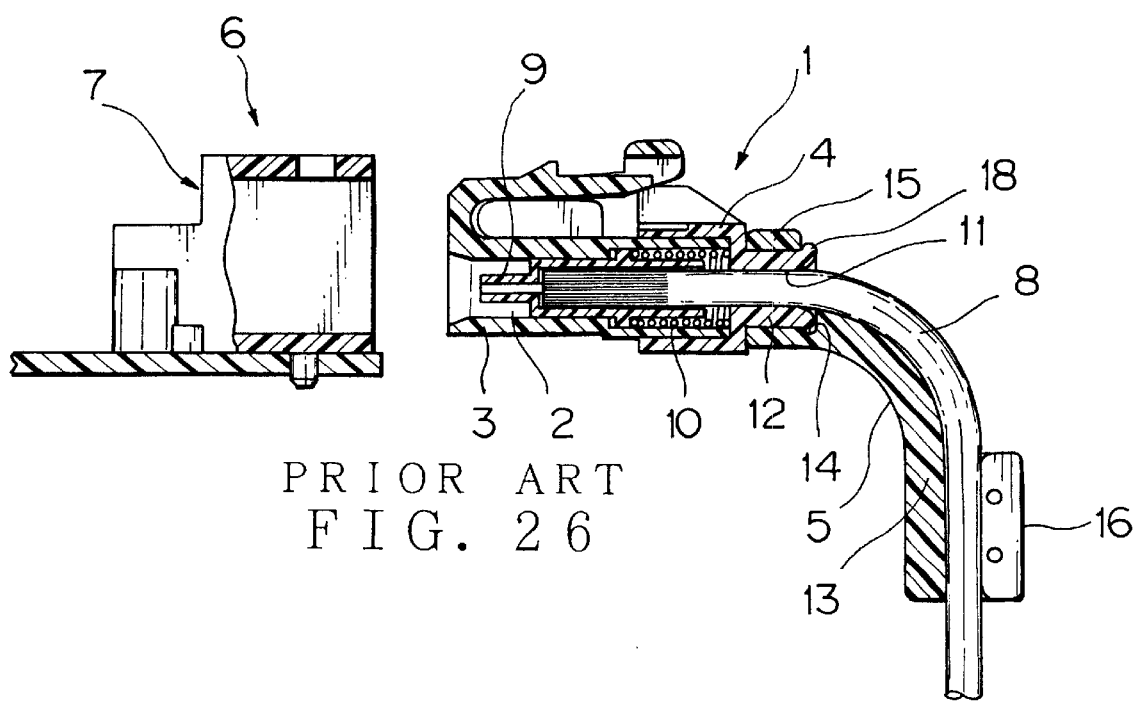
FIG. 26 is a sectional view of the prior art optical connector of FIG. 25.

Still further, the Following structure may be adopted. That is, first, the ferrules 31 with the respective directing members 26, 27 are accommodated in the optical adapter 32, as shown in FIG. 20. The optical adapter 32 is fitted in a fitting portion 135 provided for the optical adapter 32 and provided on an electric connector 138. The optical adapter 32 and a plurality of terminals 137 are fitted in an electrical housing 136 of the electric connector 138, thereby constituting a hybrid connector 139.

And, an optical plug 142 may be formed by applying the ferrules 31 with the directing members 26, 27 directly to an optical housing 141 (i.e. a housing claimed) having the optical adapter 32 integrally with the optical adapter cover 33. Referring to FIG. 20, reference character 143 designates a recess, and reference character 144 designates an engaging hole for the holder 34.

By the way, as shown in FIG. 2, the above receptacle 23 has an optical housing 151 made of conductive synthetic resin, a pair of sleeves 152, fiber optic transceivers 153, 154 (hereinafter, FOT), and a cap 155 made of conductive synthetic resin. Here, the fiber optic transceiver (i.e. FOT) is also called such as "optical element module" or "light receiving element module/luminescence element module".

The optical housing 151 is formed in a box-shape with the front and the back to be opened. The optical housing 151 has a partition 156 inside and spaces are formed in front of and at the back of the partition 156. The front space is of a coupling portion 157 for the optical plug 24. And, the back space is of an accommodating portion 158 of FOT 153.

A pair of cylindrical transferring tubes 159 projecting to the inside of the coupling portion 157 are formed on the partition 156. The transferring tube 159 connects the accommodating portion 158 and the coupling portion 157. A sleeve 152 is inserted in each of the transferring tubes 159. The coupling portion 157 is provided with an engaging portion 160 to engage the engaging projection 122 of the lock portion 117.

A partition 161 to separate the accommodated FOTs 153, 154 is formed in the accommodating portion 158. And, a plurality of engaging portions (not illustrated) for the cap 155 are provided on the inside wall of the accommodating portion 158.

The sleeve 152 has an optical fiber consisting of a core and a clad covering the core. The sleeve 152 may be formed by cutting the optical fiber 25 and by polishing the both ends.

The cap 155 is of a rectangular plate and is provided with a plurality of engaging projections (not illustrated) to engage the engaging portions (not illustrated) of the optical housing 151 on both right and left sides of the cap 155. And, the cap 155 is provided with a plurality of pressing projections 162 to push FOTs 153, 154 on a surface facing the accommodating portion 158.

And, the directing members 26, 27 may be formed as shown in FIGS. 21 to 24. Here, when the directing members 26, 27 are used, the engaging projections 45 of the ferrule 31 project from the end plane 31a toward the POF 37.

The directing members 26, 27 are curved as shown in FIG. 21 and FIG. 22. The degree of the curvature (bending) may be set freely. For example, the radius of curvature can be set up to the allowable minimum radius of the optical fiber 25.

The directing members 26, 27, as shown in FIG. 23 and FIG. 24, have a U-shaped cross section consisting of a circular arc portion 171 and a pair of straight portions 172. A pair of straight portions 172 are arranged in parallel each other and continue from respective circumferential ends of the circular arc portion 171.

And, the directing members 26, 27 each have a hole 173 and a plurality of engaging portions 174. The hole 173 is provided on one end portion of each of the directing members 26, 27. The hole 173 is bored through the circular arc portion 171. The hole 173 is formed rectangularly so as to engage the engaging projection 45 of the ferrule 31 as shown in FIG. 23.

An inner diameter of the portion with the hole 173 of the circular arc portion 171 corresponds to an outer diameter of the large-diameter portion 43 of the ferrule 31. An inner diameter of the other portion of the circular arc portion 171 basically corresponds to an outer diameter of the secondary sheathing 39. Here, the portion with the hole 173 is formed along POF 37 straight, while projecting axially from the straight portion 172.

The engaging portion 174 is formed on the straight portion 172. The engaging portion 174 has a resilient base portion 175 and a claw portion 176 inwardly projecting at, or near, the upper end portion (i.e., edge portion) of the base portion 175. The base portion 175 is formed in a strip-like shape. The base portion 175 is flush with the straight portion 172.

The claw portion 176 has a generally triangular side view having a tapered surface and inwardly projects from the base portion 175 of each of the directing members 26, 27.

And, a plurality of engaging portions 174 are arranged on each straight portion 172 between one end surface thereof and the other end surface at uniform intervals. That is, the engaging portions 174 each facing the inside of the directing member 26 or 27 are arranged staggeringly.

Each of the directing members 26, 27 is assembled with the above the ferrule 31 and the optical fiber 25 by inserting the optical fiber 25 having the ferrule 31 on its end into the pair of straight portions 172 toward the circular arc portion 171. Each of the directing members 26, 27 protects the optical fiber 25, while directing it.

Here, when the optical fiber 25 is pressed toward the circular arc portion 171, the claw portions 176 are bent outwardly by the optical fiber 25. When the optical fiber 25 is put into contact with the circular arc portion 171 as shown in FIG. 24, the claw portions 176 engage the outside surface of the optical fiber 25 so as to hold the optical fiber 25.

In the embodiments described above, the engaging projections 45 engage the respective holes 54, 68, 78, 90, and 173 so as to restrict relative displacement between the directing members 26, 27 and the respective ferrules 31. The engaging projections 45 and the holes 54, 68, 78, 90, and 173 act as the displacement restricting means.

Though the holes 54, 68, 78, 90, and 173 are bored through the respective first casings 48, 50, second casings 49, 51 and circular arc portion 171 in the above embodiments, the holes 54, 68, 78, 90, and 173 may be replaced with recesses.

Although the present invention has been fully described by way of examples with reference to the accompanying drawings, it is to be noted that various chances and modifications will be apparent to those skilled in the art. Therefore, unless otherwise such changes and modifications depart from the scope of the present invention, they should be construed as being included therein.

What is claimed is:

1. An optical connector comprising:

an optical fiber;

a ferrule provided at an end of the optical fiber;

a housing having an accommodating chamber to pivotably accommodate an end portion, including the ferrule, of the optical fiber; and a directing member to be non-pivotally secured to the ferrule for directing the optical fiber led out from the housing, wherein the directing member and the ferrule are provided with respective securing means to engage each other so as to non-pivotably secure the directing member to the ferrule; and the directing member has a U-shape cross section by having a circular portion and a pair of straight portions continuing from respective circumferential ends of the circular arc portion and has an engaging portion to engage the optical fiber so as to restrict the optical fiber from separating from the circular arc portion.

2. An optical connector comprising:

an optical fiber;

a ferrule provided at an end of the optical fiber;

a housing having an accommodating chamber to pivotably accommodate an end portion, including the ferrule, of the optical fiber; and a directing member to be non-pivotally secured to the ferrule for directing the optical fiber led out from the housing, wherein the directing member and the ferrule are provided with respective securing means to engage each other so as to non-pivotably secure the directing member to the ferrule; and the ferrule and the directing member have a displacement restricting means to restrict a relative displacement thereinbetween, and said displacement restricting means includes engaging projections and mating holes.

* * * * *